United States Patent [19]

Carr

[11] 4,413,040

[45] Nov. 1, 1983

[54] HYDROGEN/HALOGEN REACTOR SYSTEM FOR METAL HALOGEN BATTERIES

[75] Inventor: Peter Carr, Utica, Mich.

[73] Assignee: Energy Development Associates, Inc., Madison Heights, Mich.

[21] Appl. No.: 372,089

[22] Filed: Apr. 26, 1982

[51] Int. Cl.³ .............................................. H01M 8/18
[52] U.S. Cl. ...................................... 429/19; 429/49; 429/64; 429/70; 429/105
[58] Field of Search ................... 429/19, 49, 64, 70, 429/105, 17, 101, 63, 80, 20

[56] References Cited

U.S. PATENT DOCUMENTS

| | | | |
|---|---|---|---|
| 3,713,888 | 1/1973 | Symons | 136/6 |
| 3,993,502 | 11/1976 | Bjorkman, Jr. | 429/51 |
| 4,001,036 | 1/1977 | Berman et al. | 429/67 |
| 4,146,680 | 3/1979 | Carr et al. | 429/51 |

OTHER PUBLICATIONS

"Development of the Zinc–Chlorine Battery for Utility Applications", Electric Power Res. Inst., Apr. 1979, EM-1051, Parts 1–3, pp. 15–11.

Primary Examiner—Charles F. LeFevour
Attorney, Agent, or Firm—Harness, Dickey & Pierce

[57] ABSTRACT

A metal halogen battery construction containing a novel reactor means having at least two reaction zones with a reaction initiator device in each zone, whereby the reactor permits controlled recombination of hydrogen gas and halogen gas in the system to form hydrogen halide, which is then dispersed into the aqueous electrolyte of the battery.

7 Claims, 1 Drawing Figure

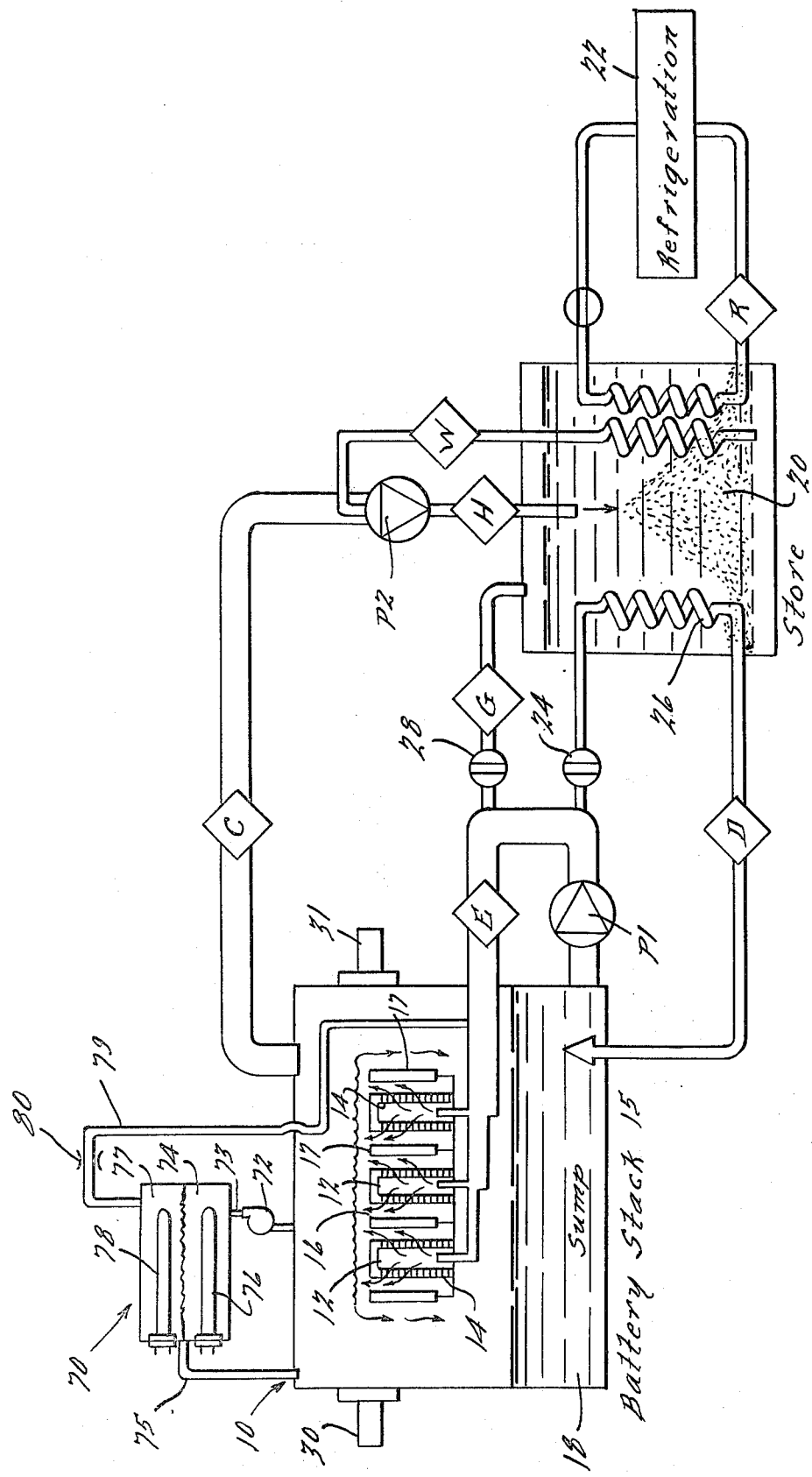

HYDROGEN/HALOGEN REACTOR SYSTEM FOR METAL HALOGEN BATTERIES

BACKGROUND OF THE INVENTION

The present invention relates to improvements in metal halogen battery systems, and more particularly the invention relates to an improved metal halogen battery construction which includes an effective hydrogen/halogen reactor which can operate safely and efficiently at virtually all hydrogen/halogen concentrations within the temperature limits of present container materials.

The electrical energy storage systems of the type referred to herein (e.g., a zinc-chlorine battery system) utilizes a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy system, liberating additional elemental halogen to be consumed at the positive electrode. Electrical energy storage systems or battery systems of this type are described in prior patents owned by the same assignee as the present invention such as U.S. Pat. Nos. 3,713,888, 3,993,502, 4,001,036, and 4,146,680. Such systems are also described in published reports prepared by the assignee herein, such as EPRI Report EM-1051 (Parts 1-3) dated April 1979, published by the Electric Power Research Institute. The specific teachings of the aforementioned U.S. patents and the EPRI Report are incorporated herein by reference.

During the cycling of a metal halogen battery, such as for example a zinc-chlorine battery, small amounts of hydrogen are generated at the zinc electrode. The hydrogen gas is normally recombined with chlorine gas to form hydrogen chloride by means of a chemical reaction (see page 15-11 of EPRI Report EM-1051). At low hydrogen concentrations (e.g., about 1-5%) the reaction proceeds smoothly. However, under certain conditions hydrogen gas may accumulate in the battery system and this can be troublesome, because at higher hydrogen concentrations (e.g., about 10% or greater), the reaction between hydrogen and chlorine becomes self propagating, and thus there may be generated pressure fronts capable of breaking or rupturing the battery container. Moreover previous techniques for carrying out the reaction (such as shown at page 15-11 of EPRI Report EM-1051) are not satisfactory at higher hydrogen concentrations or buildups. This is a significant problem, particularly with respect to the usage of such battery systems in mobile applications.

Under a variety of operating conditions, it is in many instances desirable to allow the hydrogen concentrations to build up to significant levels within the battery system. Eventually, however, to maintain the pH of the system, the hydrogen must be recombined with chlorine to reform hydrogen chloride in a safe and reliable manner. In certain instances, with high concentrations of hydrogen, in order to prevent propagation of a flame front back into the battery gas space, a flame arrester has been inserted between the reactor and the gas space. This type of technique is discussed in commonly assigned co-pending U.S. application Ser. No. 316,044 filed Oct. 28, 1981 by Hammond et al. Their combustion arrester technique works satisfactorily, however, at particularly high hydrogen concentrations, the reaction temperature in the gas space may well exceed the temperatures at which the reaction container materials are stable. In the present invention an effective hydrogen/halogen reactor is disclosed that can operate safely and efficiently at all hydrogen/halogen concentrations within the temperature limits of present container materials.

BRIEF DESCRIPTION OF THE DRAWING

The drawing illustrates a schematic of the battery construction in accordance with the invention herein.

SUMMARY OF THE INVENTION

The battery system in accordance with the present invention involves a novel reactor means which has two reaction zones. In the first reaction zone the hydrogen/halogen mixture (e.g., a hydrogen-chlorine mixture) from the battery stack enters into a water or electrolyte filled zone containing a submerged reaction initiator device. This device may be any of a number of suitable means, such as a fluorescent light, ultraviolet light, thermal initiators and the like. It is preferably a photochemical reaction initiator such as a fluorescent light. In this first zone, the hydrogen chlorine mixtures at above approximately a 15% hydrogen level will react, and the heat of reaction is transmitted to the water or electrolyte in the first reaction zone. In the preferred embodiment of the invention, a small flow of electrolyte from the battery is caused to flow through this primary or first reaction zone to keep the temperature rise therein to a minimum. The water or electrolyte filled first reaction zone also acts as an effective liquid trap to prevent flash-back to the battery sump area where higher hydrogen concentration levels may be prevalent. At hydrogen concentrations below approximately 15% hydrogen, the submerged reaction initiator or fluorescent light in the first reaction zone has proved to be inefficient in promoting full recombination of the hydrogen/chlorine mixtures. Therefore, in accordance with this invention a second reaction zone or chamber is associated with the reactor means whereby the gaseous mixture that has passed through the first reaction zone enters a second reaction zone formed by the chamber; and, in the second chamber the gas mixture passes over a second reaction initiator device (e.g., a fluorescent light) positioned in the space formed by the chamber. It has been discovered that this type of arrangement of structural elements is highly effective in recombining the hydrogen and chlorine, even at low hydrogen levels. A primary advantage of the reactor means as disclosed herein is that both low and high hydrogen concentrations can be safely handled without overheating the reactor or the associated components of the battery construction.

DESCRIPTION OF THE INVENTION

The basic operation of one embodiment of a battery system in accordance with the invention herein is now to be described. The drawing figure illustrates a zinc-chlorine battery system designated 10 wherein means are provided to achieve the desired flows of chlorine, electrolyte, water and heat.

In charge, pump P-1 delivers electrolyte to pockets 12 between pairs of porous graphite chlorine electrodes 14 in the battery stack 15. The electrolyte passes through the porous-chlorine electrodes 14 into the chamber 16 between the zinc electrodes 17 and the chlorine electrodes 14, flows up between the electrodes and eventually spills through high resistance cascades back into the sump 18. Chlorine gas is pumped by the pump designated P-2 through line C. Before entering the pump P-2, the chlorine is mixed with chilled water which passes through line W and comes from the bottom of the store 20. The chlorine and chilled water are mixed in the gas pump P-2, chlorine hydrate forms, and the chlorine hydrate-water mixture is deposited in the store 20 through line H. The water in line W is chilled by passage through a heat exchanger. Glycol cooled by means of a refrigeration system 22 is passed through line R into the heat exchanger.

In discharge, the valve 24 in line D is opened permitting a stream of warm electrolyte to pass through a heat exchanger 26 in the store. Chlorine is formed by decomposition of chlorine hydrate in the store 20. On development of the required pressure in the store, the valve 28 in line G is opened and the chlorine passes into line E on the higher pressure side of the electrolyte pump P-1. The chlorine dissolves in the electrolyte which is then fed to the porous graphite chlorine electrodes 14. The battery stack 15 can now be discharged, wherein electrode dissolution of the zinc occurs at the zinc electrode 17, reduction of the dissolved chlorine occurs at the chlorine electrode 14, power is available at the battery terminals 30,31 and zinc chloride is formed in the electrolyte by reaction of zinc and chlorine to form zinc chloride.

As referred to earlier in this inventive disclosure, during cycling of the battery certain amounts of hydrogen are generated at the zinc electrode. Under certain conditions, the hydrogen may accumulate in the system, and if not provided for, this can create a troublesome situation which could lead to a self propagating reaction between hydrogen and chlorine, leading to possible rupture or fracture of the battery case. In accordance with the invention, the hydrogen is recombined by a reaction with chlorine gas in a special reactor means designated 70 to form hydrogen chloride. The operation of the reactor means 70 is now to be described.

The reactor 70 includes associated therewith a gas pump 72 which transmits the hydrogen and chlorine containing gas mixture from the gas space above the battery sump through the line 73 such that the gas mixture is introduced or bubbled through the aqueous medium 74 which forms the first reaction zone in the reactor 70. The liquid level of the aqueous medium 74, which aqueous medium is preferably the electrolyte from the battery system, is maintained at a predetermined desired level by means of the liquid and gas return conduit 75. As the hydrogen and chlorine containing gas mixture is bubbled through the aqueous medium 74 the photochemical reaction initiator 76, which may be a fluorescent light or the like, causes the reaction of the hydrogen and chlorine within the aqueous medium to form hydrogen chloride which then substantially dissolves in the aqueous medium and returns to the battery system by means of the conduit 75. The excess hydrogen and chlorine, which are not reacted within the aqueous medium 74, then pass into the second reaction zone 77 formed by the chamber or gas space above the level of the aqueous medium 74. Within the chamber 77 the remaining hydrogen and chlorine gases are caused to react by the second reaction initiator device 78, and thusly, the hydrogen chloride gas formed in the chamber 77 is also returned to the battery system through the return line 75. In the preferred embodiment the amount of the aqueous electrolyte 74 in the first reaction zone is maintained at the desired level by means of the feed line 79 which transmits electrolyte from line E of the battery system through the orifice 80, which orifice is designed to control the amount of electrolyte fed to the reactor 70 such that the amount of the aqueous electrolyte in the reactor 70 is maintained at a desired level. The type of reactor construction as described hereinabove has been found to be highly effective in recombining hydrogen and chlorine even at low hydrogen levels. The advantage of this type of reactor construction is that both low and high hydrogen concentrations can be safely handled without overheating and without detrimentally affecting the reactor or other parts of the battery system.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a metal halogen battery construction, the improved combination of,
    at least one cell having a positive electrode and a negative electrode, separated by aqueous electrolyte containing the material of said metal and halogen,
    sump means wherein the electrolyte is collected,
    store means wherein halogen hydrate is formed and stored as part of an aqueous material,
    means for circulating electrolyte through the cell,
    conduit means for transmitting halogen gas formed in the cell to hydrate forming means associated with the store means,
    a reactor means associated with said construction whereby halogen gas formed in the cell can be reacted to form hydrogen halide by controlled chemical reaction,
    said reactor means including at least two reaction zones operative to prevent self-propagation of the reaction into other areas of the battery construction,
    the first reaction zone being comprised of a reaction initiator means submersed in an aqueous medium to which hydrogen/halogen gas mixtures from the cell are introduced and reacted to form hydrogen halide,
    the second reaction zone being comprised of a chamber means in communication with the first zone, and with said chamber also including a reaction initiator means to cause the reaction of any remaining hydrogen and halogen, and
    means for returning the hydrogen halide formed in the reactor means for re-dispersion in the aqueous electrolyte.

2. The invention of claim 1 wherein,
    said battery construction is a zinc-chlorine battery construction.

3. The invention of claim 1 wherein, said aqueous medium in the first reaction zone is the aqueous electrolyte, and a desired amount of said electrolyte from the battery sump is caused to continually flow into the first reaction zone to maintain a desired level of electrolyte therein.

4. The invention of claim 3 wherein,
said electrolyte is an aqueous zinc-chloride electrolyte.

5. The invention of claim 4 wherein, said chamber means forming the second reaction zone is a gas space immediately above the level of the aqueous medium in the first reaction zone.

6. The invention of claim 6 wherein,
said reaction initiator means is a fluorescent light.

7. The invention of claim 1 wherein,
said chamber means forming the second reaction zone is a gas space immediately above the level of the aqueous medium in the first reaction zone.

* * * * *

UNITED STATES PATENT AND TRADEMARK OFFICE
CERTIFICATE OF CORRECTION

PATENT NO. : 4,413,040
DATED : November 1, 1983
INVENTOR(S) : Peter Carr

It is certified that error appears in the above-identified patent and that said Letters Patent is hereby corrected as shown below:

Col. 6, line 4, "6" should be --5--.

Signed and Sealed this

Tenth Day of April 1984

[SEAL]

Attest:

GERALD J. MOSSINGHOFF

Attesting Officer   Commissioner of Patents and Trademarks